United States Patent
Choi (10) Patent No.: US 11,750,549 B2
(45) Date of Patent: Sep. 5, 2023

(54) FILE-RELATED TASK MANAGEMENT DEVICE

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

( * ) Notice: Subject to any disclaimer, the term of this patent is extended or adjusted under 35 U.S.C. 154(b) by 24 days.

(21) Appl. No.: 16/282,659

(22) Filed: Feb. 22, 2019

(65) Prior Publication Data

US 2020/0204511 A1    Jun. 25, 2020

(30) Foreign Application Priority Data

Dec. 20, 2018    (KR) .......................... 10-2018-0166000

(51) Int. Cl.
*H04L 51/216*    (2022.01)
*H04L 51/08*    (2022.01)

(52) U.S. Cl.
CPC ............ *H04L 51/216* (2022.05); *H04L 51/08* (2013.01)

(58) Field of Classification Search
CPC ................................ H04L 51/16; H04L 51/08
USPC .......................................................... 709/206
See application file for complete search history.

(56) References Cited

U.S. PATENT DOCUMENTS

| 9,395,893 | B1 * | 7/2016 | Beausoleil | .......... G06F 3/04842 |
| | | | | 709/204 |
| 9,996,248 | B2 * | 6/2018 | Park | ...................... G06F 3/0487 |
| 2008/0114844 | A1 * | 5/2008 | Sanchez | .............. H04L 67/1095 |
| | | | | 709/206 |
| 2013/0198304 | A1 * | 8/2013 | Jung | ................... H04L 12/1818 |
| | | | | 709/206 |
| 2014/0181697 | A1 * | 6/2014 | Kirigin | ................... G06F 3/048 |
| | | | | 715/758 |

(Continued)

FOREIGN PATENT DOCUMENTS

| KR | 10-1169801 B1 | 7/2012 |
| KR | 10-1295209 B1 | 9/2013 |
| KR | 10-2016-0030462 A | 3/2016 |

OTHER PUBLICATIONS

Marc Smith & JJ Cadiz, Byron Burkhalter, "Conversation Trees and Threaded Chats", CSCW'00, Dec. 2-6, 2000. Philadelphia, PA. ACM 1-58113-222-0/00/0012, 2000.*

(Continued)

*Primary Examiner* — Mohamed A. Wasel
*Assistant Examiner* — John Fan
(74) *Attorney, Agent, or Firm* — Paratus Law Group, PLLC (57) ABSTRACT

A file-related task management device includes: a memory; and a processor electrically connected to the memory, wherein the processor creates a file chat room that is associated with a file in a folder shared by one or more folder sharers and is accessible through the file, receives, from a user terminal of the one or more folder sharers, an update log for an update to the file made by the user terminal, and displays a message thread in the file chat room, the message thread including a log message for the update, wherein chat messages related to the file between the one or more folder sharers and the log message are displayed together in the file chat room.

16 Claims, 6 Drawing Sheets

(56) References Cited

U.S. PATENT DOCUMENTS

2014/0237057 A1* 8/2014 Khodorenko ........... H04L 51/32
                                                709/206
2017/0090704 A1* 3/2017 Hu ........................ H04L 51/046
2017/0374075 A1* 12/2017 Boval ..................... H04L 51/22

OTHER PUBLICATIONS

Korean Office Action for related KR Application No. 10-2018-0166000 dated May 21, 2020 from Korean Intellectual Property Office.

* cited by examiner

FILE-RELATED TASK MANAGEMENT DEVICE

CROSS-REFERENCE TO RELATED APPLICATION

This application claims priority to and the benefit of Korean Patent Application No. 10-2018-0166000 filed on Dec. 20, 2018, which is hereby incorporate by reference in its entirety.

BACKGROUND

The present invention relates to a task management technology, and more particularly, to a technology that keeps a record of file changes and modifications, along with chats, while performing a task through a chat room for each file.

In general, an internet messenger is an application that transmits messages containing text or graphics between users, and may come in the form of a chat room which a plurality of users can join. In an exemplary embodiment, the internet messenger may be a mobile messenger that runs in a mobile environment (for example, on a mobile phone), examples of which include KakaoTalk, Line, WeChat, Facebook Messenger. Moreover, such internet messengers are used for a wider variety of applications in regard to managing and performing tasks.

SUMMARY

The present invention provides a tool for communication about a task-related file between task members through a chat room associated with the file.

The present invention also provides a task processing technology associated with a chat room that can keep a record of modifications or changes to a particular file made by members, along with the file, through a chat room associated with the file.

An exemplary embodiment of the present invention provides a file-related task management device comprising: a memory; and a processor electrically connected to the memory, wherein the processor creates a file chat room that is associated with a file in a folder shared by one or more folder sharers and is accessible through the file, receives, from a user terminal of the one or more folder sharers, an update log for an update to the file made by the user terminal, and displays a message thread in the file chat room, the message thread including a log message for the update, wherein chat messages related to the file between the one or more folder sharers and the log message are displayed together in the file chat room.

Another exemplary embodiment of the present invention provides a file-related task management method that is performed by a file-related task management device comprising a memory and a processor electrically connected to the memory, the method comprising: creating a file chat room that is associated with a file in a folder shared by one or more folder sharers and is accessible through the file, receiving, from a user terminal of the one or more folder sharers, an update log for an update to the file made by the user terminal, and displaying a message thread in the file chat room, the message thread including a log message for the update, wherein chat messages related to the file between the one or more folder sharers and the log message are displayed together in the file chat room.

Yet another exemplary embodiment of the present invention provides a recording medium storing a computer program for a computer-executable, file-related task management method, the recording medium comprising: (a) creating a file chat room that is associated with a file in a folder shared by one or more folder sharers and is accessible through the file, (b) receiving, from a user terminal of the one or more folder sharers, an update log for an update to the file made by the user terminal, and (c) displaying a message thread in the file chat room, the message thread including a log message for the update, wherein chat messages related to the file between the one or more folder sharers and the log message are displayed together in the file chat room.

DETAILED DESCRIPTION

Explanation of the present invention is merely embodiments for structural or functional description, so the scope of the present invention should not be construed to be limited to the embodiments explained in the embodiment. That is, since the embodiments may be implemented in several forms, it should also be understood that the scope of the present invention includes equivalents able to realize its technical idea. In addition, it does not mean that a specific embodiment embraces all the purposes or effects suggested in the present invention or embraces only such effects, and therefore, it should be understood that the scope of the present invention is not limited thereto.

Meanwhile, terms used in the following description need to be understood as below.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

Identification symbols (e.g., a, b, c, etc.) of individual steps are used for convenience of description and do not describe a sequence of the steps. The individual steps may be performed in a sequence different from a described sequence unless a specific sequence is clearly described in the context. In other words, the steps may be performed in the described sequence, performed substantially at the same time, or performed in a reverse sequence.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable recording medium may be distributed in a computer system connected by a network, and store and implement a computer-readable code in a distributed manner.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Figure 1:
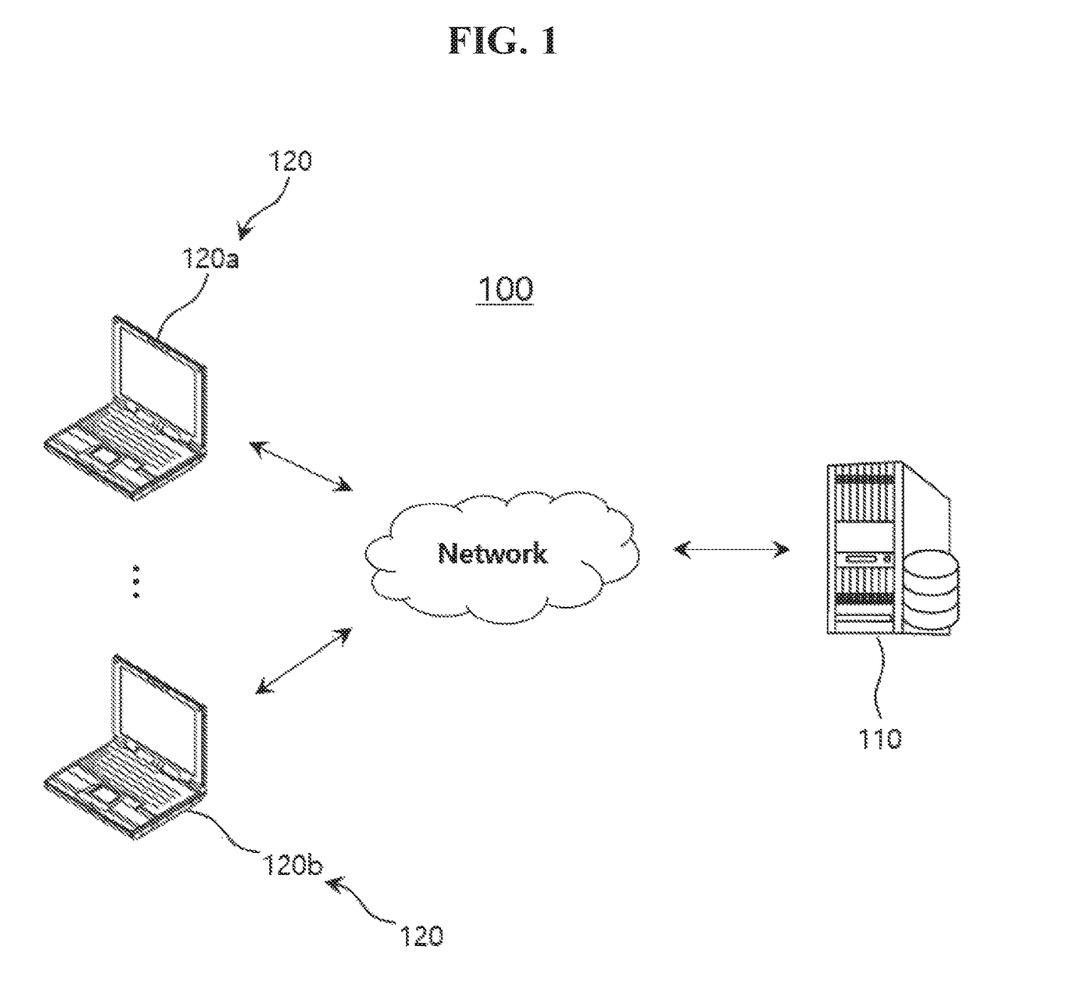
FIG. 1 is a view illustrating a file-related task management system according to an exemplary embodiment of the present invention.

FIG. 1 is a view illustrating a file-related task management system 100 according to an exemplary embodiment of the present invention.

Referring to FIG. 1, a file-related task management system 100 includes a file-related task management device 110 and one or more user terminals 120.

The file-related task management device 110 is a computing device that can be connected to at least one user terminal 120 through a network. In an exemplary embodiment, the file-related task management device 110 may manage at least one group in which a user associated with the user terminal 120 is included as a member.

In an exemplary embodiment, the file-related task management device 110 may be connected to the user terminal 120 through a shared folder agent installed on the user terminal 120. Here, the shared folder agent is an agent program, which is software that, once installed on the user terminal 120, allows the user terminal 120 and the file-related task management device 110 to work in conjunction with each other through a network under approval from the user terminal 120.

The user terminal 120 is a computing device that can be connected to the file-related task management device 110 through a network—for example, a terminal that comes in the form of a desktop, a laptop, a tablet PC, or a smartphone.

In an exemplary embodiment, a first user terminal 120a may be a mobile terminal, and may be connected to the file-related task management device 110 through cellular communication or WiFi communication. In another exemplary embodiment, a second user terminal 120b may be a desktop, and may be connected to the file-related task management device 110 through the internet. Here, a first user and a second user respectively corresponding to the first user terminal 120a and the second user terminal 120b may be folder sharing participants who participate in a shared folder or file sharing participants who have the right to access a shared file.

Figure 2:
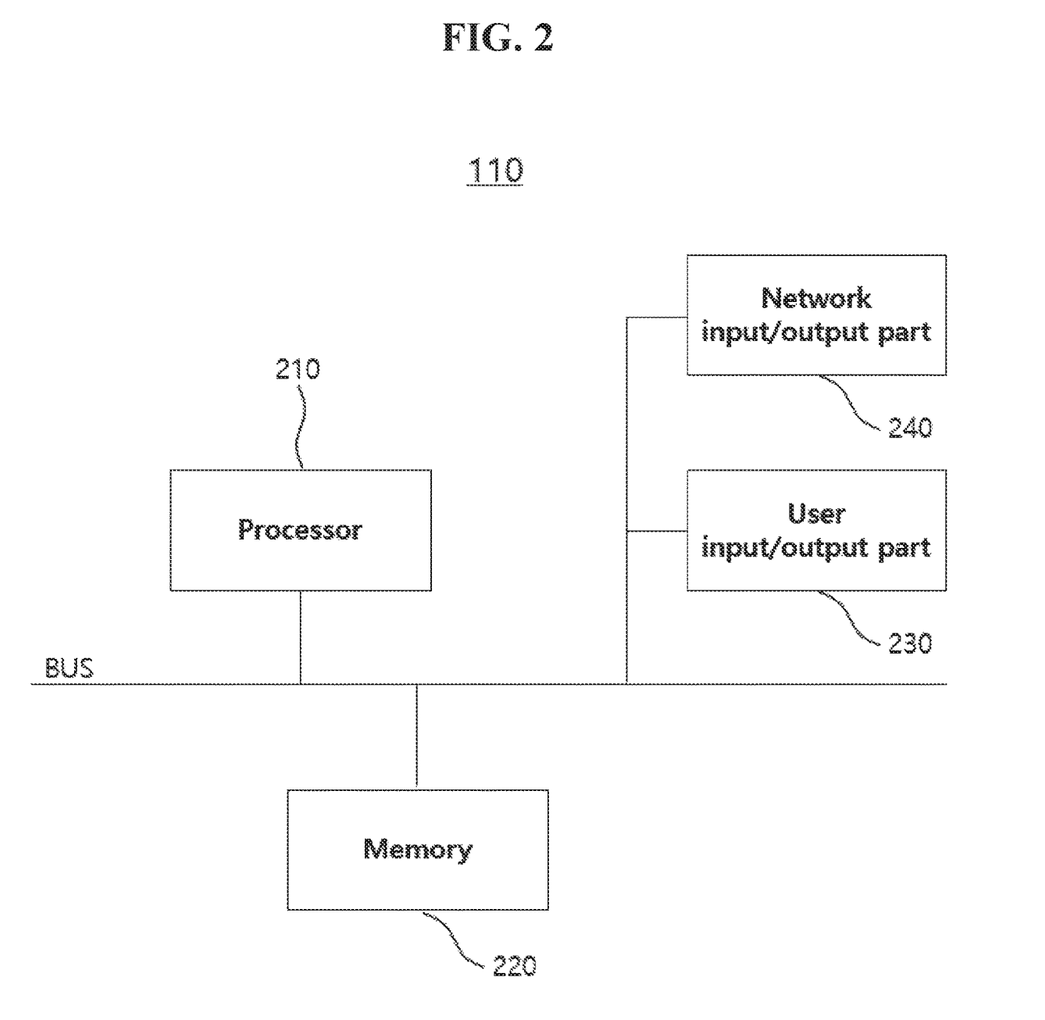
FIG. 2 is a block diagram of a file-related task management device according to an exemplary embodiment of the present invention.

FIG. 2 is a block diagram of a file-related task management device 110 according to an exemplary embodiment of the present invention.

Referring to FIG. 2, the file-related task management device 110 may include a processor 210, a memory 220, a user input/output part 230, and a network input/output part 240.

The processor 210 may execute a file-related task management procedure according to the exemplary embodiment of the present invention, manage the memory 220 which is read or written in this procedure, and schedule time synchronization between volatile and non-volatile memories in the memory 220.

The processor 210 may control the overall operation of the file-related task management device 110, and may be electrically connected to the memory 220, user input/output part 230, and network input/output part 240 and control data follow between them. The processor 210 may be implemented as a CPU (Central Processing Unit) of the file-related task management device 110. More details of the operation of the processor 210 will be described below with reference to FIG. 3.

The memory 220 may include auxiliary storage which is implemented as a non-volatile memory such as SSD (Solid State Disk) or HDD (Hard Disk Drive) and used to store overall data required for the file-related task management device 110 and primary storage which is implemented as a volatile memory such as RAM (Random Access Memory). That is to say, the memory 220 may be implemented as a volatile or non-volatile memory, and may be connected by a hyperlink if implemented as a non-volatile memory.

The user input/output part 230 includes an environment for receiving user input and an environment for outputting particular information to the user—for example, an input device including an adapter such as a mouse, trackball, touchpad, graphic tablet, scanner, touchscreen, keyboard, or pointing device, and an output device including an adaptor such as a monitor or touchscreen. In an exemplary embodiment, the user input/output part 230 may correspond to a computing device connected via a remote connection, in which case the file-related task management device 110 may serve as a server.

The network input/output part 240 may include an environment for connecting to the user terminal 120 via a network—for example, an adapter for LAN (Local Area Network) communication.

Figure 3:
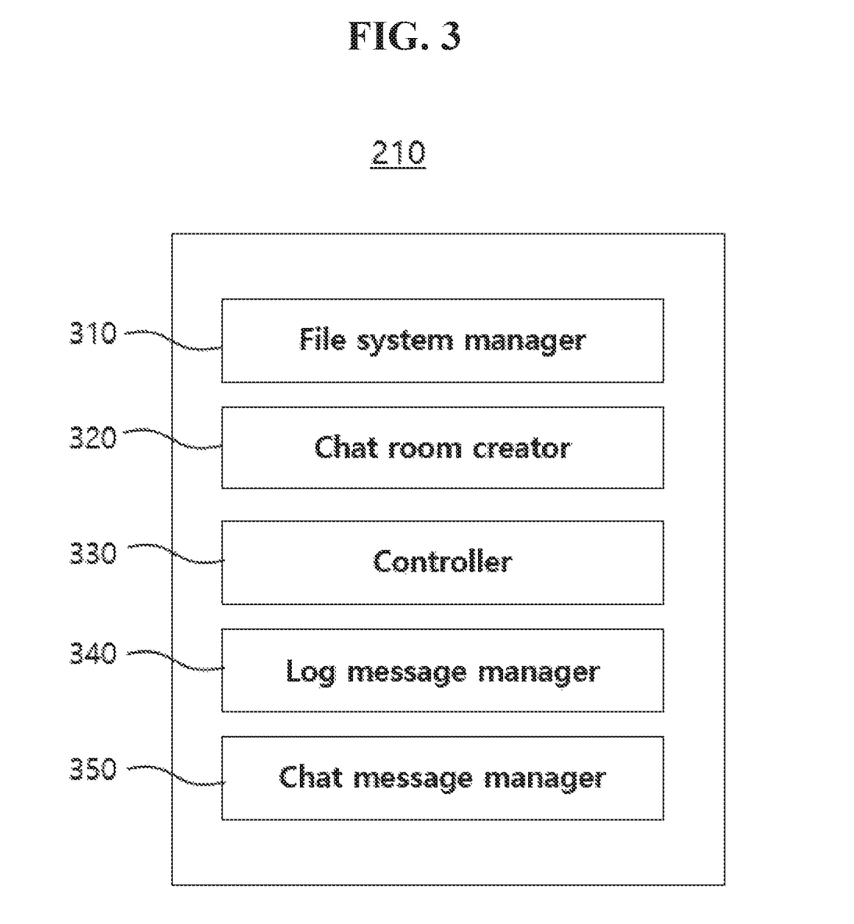
FIG. 3 is a block diagram of a processor in a file-related task management device according to an exemplary embodiment of the present invention.

FIG. 3 is a block diagram of a processor 210 in a file-related task management device 110 according to an exemplary embodiment of the present invention.

According to the exemplary embodiment to be explained with reference to FIG. 3, the processor 210 may include a file system manager 310, a chat room creator 320, a controller 330, a log message manager 340, and a chat message manager 350. However, the processor 210 according to the exemplary embodiment of the present invention does not necessarily include all of the above components, some of these components may be omitted in some embodiments, and the processor 210 may include some or all of the aforementioned components.

The file system manager 310 provides a list of files in a shared folder type file system, which is managed by the file-related task management device 110, shared by one or more folder sharers, and accessible by user terminals 120 corresponding to one or more of the folder sharers, and manages users' access rights.

When a user terminal 120 accesses or tries to access a shared folder managed by the file-related task management device 110, the file system manager 310 may detect the user terminal 120's access or receive a notification signal about it. More specifically, the file system manager 310 may receive a request for access to a shared folder from the user terminal 120, and may determine whether to allow the user terminal 120 access by checking the user's access rights.

Alternatively, when the user terminal 120 accesses or tries to access a shared folder managed by the file-related task managed device 110, the file system manager 310 may sort out files available to the user terminal 120—that is, files which the user terminal 120 has the right to access or read—and arrange and display them in the file system, or may provide a list of such files.

Here, the file system manager 310 may obtain user information or user terminal identification information associated with the user terminal 120 and check the user terminal 120's access rights to the folder. The file system manager 310 may allow access only when the user or the user terminal 120 is found to have the right to access the shared folder.

The chat room creator 320 may create one or more file chat rooms associated with a file in a shared folder, upon a request from a user terminal 120. Here, the file chat room is a chat room associated with a particular file, which is accessible through the file and in which chat messages about the file between one or more user terminals 120 and log messages about updates to the file can be recorded.

Alternatively, if one or more users among the folder sharers creates a log message by modifying or changing a particular file based on their legitimate rights, enters a chat message about the file, or sends the entered chat message, the chat room creator 320 may recognize it as a file chat room creation request and create a file chat room, even without a file chat room creation request from a user terminal 120.

Alternatively, in a case where only a normal chat room associated with a particular file was opened and has been used, if the file is modified or changed, the chat room creator 320 may switch the normal chat room to a file chat room. A log message about a modification to the associated file cannot be entered in or displayed on the normal chat room, whereas, if the file is updated in the shared folder or updated through the file chat room, such as modifications or changes, a log message for the file update, along with a chat message, can be displayed and recorded through a chat window of the file chat room.

The controller 330 may create a chat file containing a message thread that will be displayed through a file chat room. The message thread may include chat messages and log messages. The chat messages are typical chat messages that are entered by the user terminal 120 through a chat window of the chat room. Text, images, voice, file objects, etc. may be entered as chat messages. Accordingly, the chat messages may be in the form of one or more among text, image, voice, or document.

The log messages are messages that show an update log of update events, such as modifications or changes to the file with which the file chat room is associated, which may be displayed through the file chat room.

The controller 330 may create a chat file object including both chat messages and log messages. Thus, a message thread contained in the chat file object may include both chat messages and log messages. The chat file object is displayed through the file chat room. Accordingly, file-related chat messages between one or more folder sharers and log messages of file updates made by one or more folder sharers may be displayed together in the file chat room rendered on the user terminal 120.

The controller 330 may put chat messages and log messages together and arrange them in the order they are created. Thus, if a log message is created for a file update that is made when a chat message is being typed, a log message may be inserted in the midst of the chat message. Moreover, since new chat messages and new logs messages are continuously created, the controller 330 may update the chat file object in real time to keep up with them.

That is, the chat file object created by the controller 330 is rendered through the file chat room, and the file chat room is opened through the associated file. The chat file object contains a message thread, and the message thread may include both chat messages and log messages.

The controller 330 displays chat messages and log messages together in the file chat room in chronological or reverse chronological order depending on the time the messages are created. Also, new chat messages and log messages may be continuously displayed in the chat window each time they are created.

If the file is not updated for more than a certain amount of time, the controller 330 may store in the shared folder a final version of the file which was updated most recently by a user terminal 120, and may delete previous versions of the file in order of oldest to most recent. Alternatively, if the controller 330 chooses a file to delete first, file system manager 310 may delete the file or move it to a separate storage space.

The controller 330 may check the user terminal 120's rights on reading or updating the file. When the user terminal 120 accesses the shared folder or the file or makes a request to access it, the controller 330 checks the user's rights corresponding to the user terminal 120 by using identification information of the user terminal 120. The controller 330 may receive a file update log from the user terminal 120 only when the user terminal 120 is found to have legitimate rights to update the file. Otherwise, even if the user terminal 120 modifies the file, no corresponding update log may not be created or the file-related task management device 110 may not receive it.

Alternatively, the controller 330 may check the user's rights corresponding to the user terminal 120 by using identification information of the user terminal 120, and may store an update log or create a log message only when the user terminal 120 is found to have legitimate rights to update the file. Otherwise, the content of the file modified by the user terminal 120 may be deleted immediately, and no log message is created.

If a new message is created and accumulated in the file chat room, the controller 330 may send a notification about this to the user terminal 120. If one or more new chat messages or log messages are created, the controller 330 may send a notification message to the user terminals 120 of folder sharers who have the right to access the file. Alternatively, the notification message may be sent to the user terminal 120 through the network input/output part 240.

If the file is updated by one or more folder sharers, the log message manager 340 creates a log message for the update. The log message manager 340 may receive data on the update from the user terminal 120 who has the updated the file or the memory 220 of the file-related task management device 110. When a log message is created, the log message manager 340 may keep a record of when the update was made through which folder sharer's user terminal 120. Thus, the log message may contain information such as who updated the file, the update time, and so forth.

That is, the log message manager 340 may create a log message containing information about the folder sharer who updated the file and details of the update.

Moreover, the log message manager 340 may take some portion of the file that is updated, that is, an updated portion of the file, along with the log message. The updated portion of the file may be displayed in the file chat room, along with the log message. Alternatively, the log message manager 340 may provide an access path to a final version of the file created by the file update through the file chat room, along with the log message.

The chat message manager 350 may receive a chat message from the user terminal 120 and create a chat message. The chat message may be in the form of one or more of the following file objects: text, image, voice, and document. The chat message manager 350 also may create a chat message including which folder sharer has entered what message and when. To this end, identification information of the user terminal 120 may be used.

As new chat messages are continuously inputted in real time from the user terminal 120, the chat message manager 350 may create new chat messages, and the controller 330 may continue to update the chat file objects.

If an update log is generated in association with a chat message, the log message manager 340 and the chat message manager 350 may collaboratively create information on the association between the log message and the chat message. That is, in a case where a task is assigned through a chat message and a file is updated as assigned, the log message may contain identification information of the related chat message as association information, and the chat message may contain identification information of the related log message. The chat message and log message associated with each other may be continuously outputted together.

In contrast, if the assignment is not completed by the creation of a log message, the chat message may appear repeatedly or pinned to a particular position at the top or bottom of the chat window of the file chat room.

Figure 4:
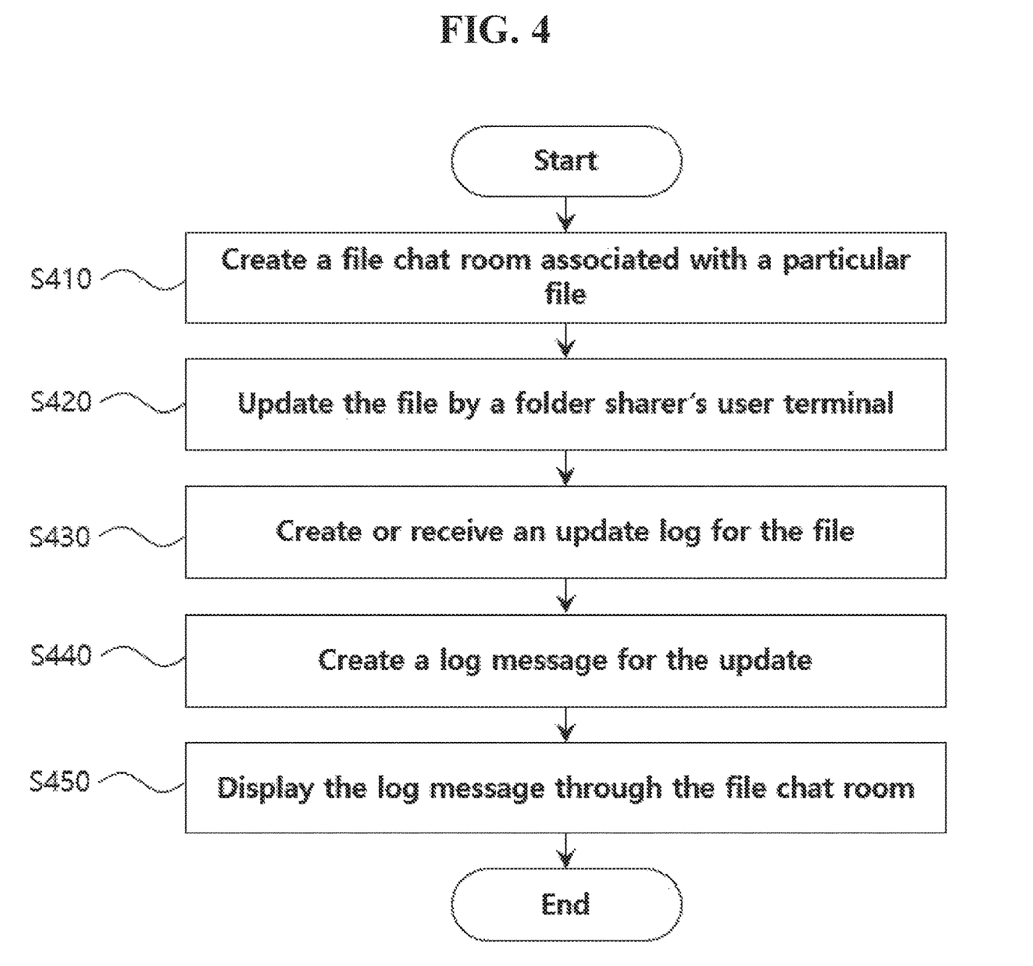
FIG. 4 is a flowchart showing a file-related task management method according to an exemplary embodiment of the present invention.

FIG. 4 is a flowchart showing a file-related task management method according to an exemplary embodiment of the present invention.

First of all, the file-related task management device 110 may create a file chat room associated with a particular file in a shared folder (S410).

Then, the file is updated by a user terminal 120 who has the right to access and update the file (S420). Here, a file update may refer to every change made to a file, including when a file is created, modified, changed, or edited, or when file access rights are changed.

As the file is updated by the user terminal 120, the file-related task management device 110 may create or receive an update log (S430). That is, if the user terminal 120 accesses a file stored in the memory 220 of the file-related task management device 110 through a shared folder and then modifies the file, the user terminal 120 may create an update log and send it to the file-related task management device 110, or the file-related task management device 110 itself may create and store an update log.

Next, the file-related task management device 110 creates a log message based on the created update log (S440). According to an exemplary embodiment, one log message may be created for each update log. Thus, it can be said that, if n update logs are created, the number of log messages is n.

The file-related task management device 110 may display a log message through the file chat room (S450). The file-related task management device 110 may create a chat file object which includes a message thread containing log messages and which may be provided to the user terminal 120 and rendered through the file chat room.

Accordingly, as the file-related task management device 110 provides a chat file object to the user terminal 120 and the chat file object is rendered through the file chat room, some or all of the log messages in the message thread included in the chat file object may be displayed on the user terminal 120 through the file chat room.

As for any chat messages created before or after an update log is generated, the file-related task management device 110 may display the chat messages and the log message together through a chat window in the file chat room. Also, the chat messages and the log message may get mixed up with each other and displayed together in one chat window in chronological or reverse chronological order depending on the time the messages are created.

Figure 5:
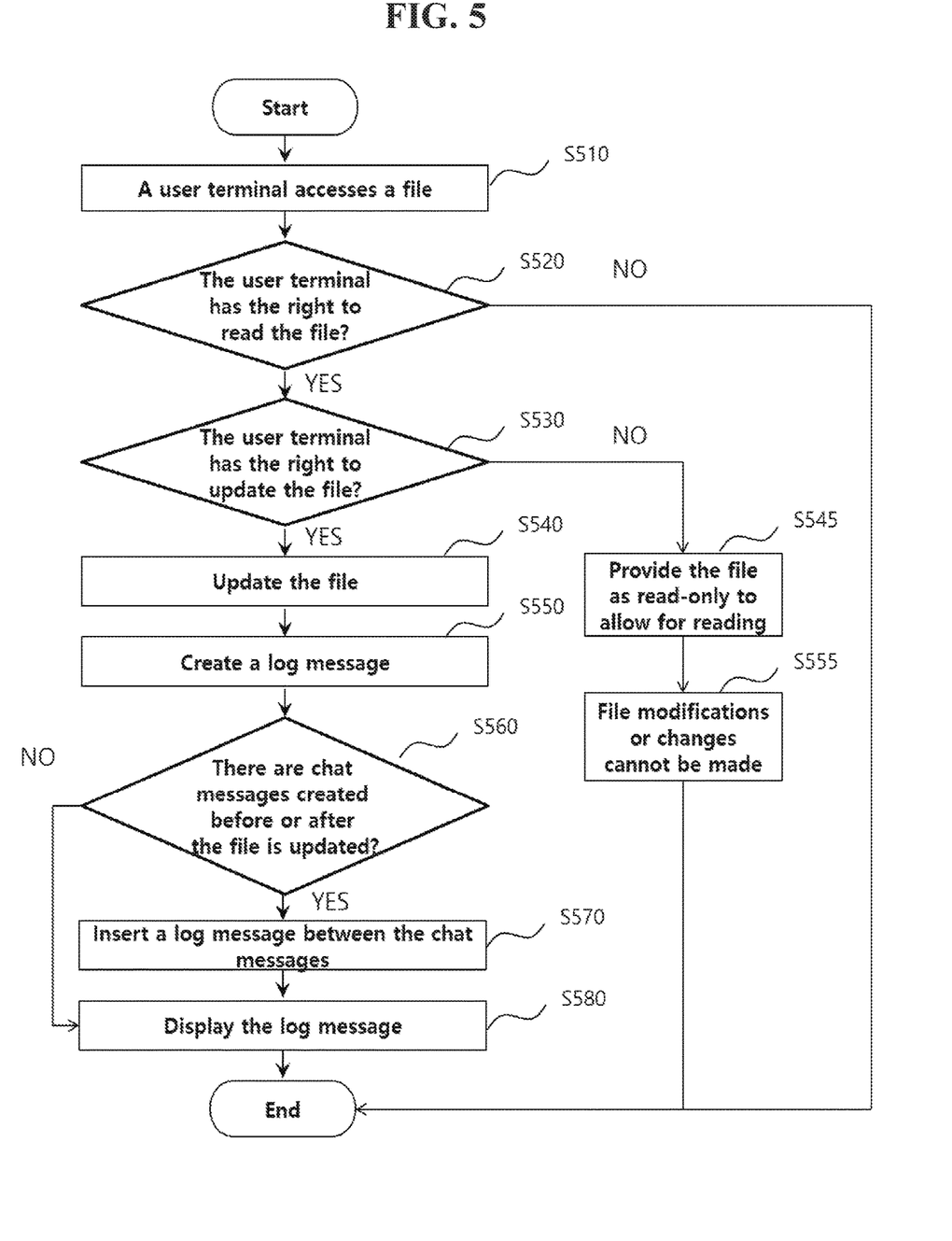
FIG. 5 is a flowchart showing a file-related task management method according to another exemplary embodiment of the present invention.

FIG. 5 is a flowchart showing a file-related task management method according to another exemplary embodiment of the present invention.

When a user terminal 120 accesses a file in a shared folder, the file-related task management device 110 detects the user terminal 120's access (S510).

The file-related task management device 110 identifies whether the user terminal 120 is a user having the right to read the file (S520). If the user terminal 120 accessing the file is found to have no right to even read the file, aside from the right to update the file, the process may be ended immediately.

Then, the file-related task management device 110 may identify whether the user of the user terminal 120 has the right to update the file, as well as the right to read the file (S530).

That is, in S520 and S530, the file-related task management device 110 may check whether the user accessing the file through the shared folder has the rights to read and update the file. If the user terminal 120 is found to have the right to read but not the right to update, the file-related task management device 110 may open the file as read-only to allow the user terminal 120 to read it (S545). In this case, the user terminal 120 cannot make an update, such as modifying or changing the file (S555). As such, the user terminal 120's attempts to make an update, such as modifying or changing the file, will fail. Even if the file is modified on the user terminal 120, no update log is created. Even if an update log is created, it is not sent to the file-related task management device. Even if the update log is sent, the file-related task management device creates no corresponding log message after checking the user terminal 120's rights.

After the file-related task management device 110 checks whether the user has the rights to read and update the file in S520 and S530, if the user is found to have the rights to both read and update the file, the file may be updated by the user terminal 120 of the user (S540). If the user has neither the right to read the file nor the right to update it, the process may be ended.

When the file is updated by the user terminal 120, the file-related task management device 110 may create a log message for the update (S550).

Next, the file-related task management device 110 checks whether there are chat messages created before or after the file is updated by the user terminal 120 (S560). That is, it is checked whether there are chat messages that are inputted from the user terminal 120 before or after the file update time.

If there are chat messages created before or after the file update, a log message may be inserted between the chat messages to create a chat file object including both the chat messages and the log message (S570).

The file-related task management device 110 may provide a chat file object to the user terminal 120, and the user terminal 120 may render the chat file object through a file chat room, thereby displaying a message thread including the log message that show an update log such as file modifications or changes (S580).

Figure 6:
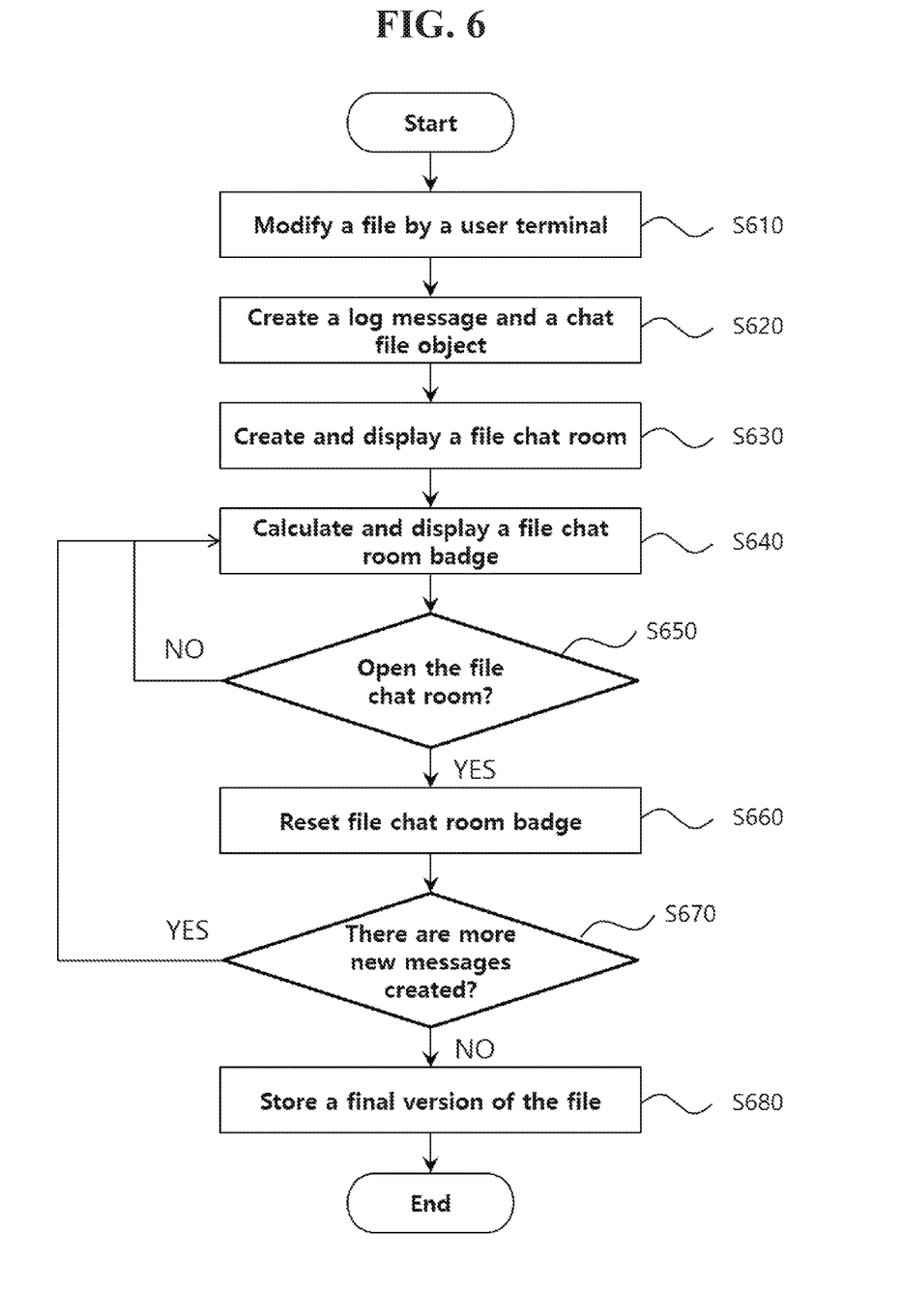
FIG. 6 is a flowchart showing a file-related task management method according to yet another exemplary embodiment of the present invention.

FIG. 6 is a flowchart showing a file-related task management method according to yet another exemplary embodiment of the present invention.

According to the exemplary embodiment to be explained with reference to FIG. 6, the file-related task management device 110 may provide a chat message and a log message together through a file chat room, and also may provide chat room badges by calculating chat room badge values according to the number messages the user has not read.

First of all, the user terminal 120 modifies or changes a file in a shared folder (S610).

Thus, when an update log for the file is generated, the file-related task management device 110 creates a log message for the update (S620). Notably, the file-related task management device 110 may automatically create a file chat room when creating a log message along with the generation of an update log, even without a request from the user terminal 120 to create a file chat room. Also, when a file list is provided, a file chat room associated the file may be displayed along with the file (S630).

Here, the file-related task management device 110 may calculate a badge value of a file chat room badge and display the chat room badge (S640). The badge value of the file chat room may be determined by the number of unread chat messages or the number of unread log messages, which have not been checked or read by the user terminal 120.

Here, the file chat room badge may indicate the cumulative umber of unread chat messages and the cumulative number of unread log messages.

According to an exemplary embodiment, the file chat room badge may include two or more badges, which may include a first badge and a second badge. For example, the first badge may be a chat message badge that indicates the cumulative number of unread chat messages, and the second badge may be a log message badge that indicates the cumulative number of unread log messages. In this case, two badges may be provided to the file chat room which is displayed along with the file list.

Alternatively, according to another exemplary embodiment, the file-related task management device 110 may display the file chat room badge as one integrated badge, and the way how the integrated badge value is calculated may be displayed when additional information on the badge value is displayed—that is, the number of unread chat messages and the number of unread log message may be shown in a separate space. In this instance, one badge may be provided to the file chat room which is displayed along with the file list. Also, the number of unread chat messages and the number of unread log message may be provided in a certain space in the file chat room or in a separate pop-up window when the file chat room is opened.

For example, if the cumulative number of unread chat messages is 7, the cumulative number of unread log messages is 8, and these numbers bring the badge value of the file chat room badge to 15, the file-related task management device 110 may i) provide a file room badge with a badge value of 15 while indicating that the cumulative number of unread chat messages is 7 and the cumulative number of unread log messages is 8, ii) provide a file chat room badge with a badge value of 15, a first badge with a badge value of 7, and a second badge with a badge value of 8, or iii) provide a first badge with a badge value of 7 and a second badge with a badge value of 8; however, the exemplary embodiment is not limited thereto.

Afterwards, when the file chat room is opened upon a request from the user terminal 120 (S650), the file-related task management device 110 may provide the user terminal 120 with a chat file object that will be displayed in the file chat room so that the file chat room and a message thread are displayed. Accordingly, the file chat room badge value may be reset (S660). [89] Resetting the file chat room badge value may mean that the badge value of a file chat room with unread messages which was opened by the user terminal 120 is set to zero after the user reads those messages. Here, the unread messages may include all chat messages and log messages the user has not read yet.

Therefore, a file chat room badge gives cumulative counts of log messages and new chat messages which increase as the number of file updates increases, when an update is made, including all events such as uploading and/or modifying, adding, changing, and updating a particular file, or when a new chat message is entered by folder sharing participants or files sharers of a shared folder.

The file-related task management device 110 may display the total numbers of chat messages and log messages not read or checked by a particular user terminal 120 on the user's terminal through a file chat room badge.

It should be noted that a file chat room badge for a cumulative count of log messages according to the exemplary embodiment of the present invention does not simply indicate the cumulative number of update logs for the aforementioned events; rather it indicates the cumulative number of update logs that have not been checked by a particular user.

Accordingly, each file chat room has a different file chat room badge, and at the same time each user has their own counts that are recoded and visible, because, if a plurality of users participate in folder sharing, they have differences about which files they opened or not, which chat rooms they have not read, and which chat messages and log messages in the chat rooms they have not read. Therefore, a file chat room badge can be said to be an index that can quantify and show items for a particular file chat room that need to be read and checked later by one particular user.

For instance, in a case where a sharing participant having the right to update a file updates the file, such as making modifications or changes and adding another file or a note, and therefore n file update logs are created and n unread log messages are accumulated in a file chat room, the file chat room badge visible to a user has a badge value of n until the user checks those file update logs or those log messages. Afterwards, if the user opens the file chat room or the file and checks all of the n file update logs or the n log messages by reading all new update logs or log messages, the badge value of the file chat room badge visible to the user is reset to zero.

Moreover, if there is no request signal to open the file chat room from the user terminal 120 about opening the file, or new chat messages or log messages are created and accumulated without a request to open the file chat room, the badge value of the file chat room may continuously go up and get updated without being reset to zero (S640).

New messages may be created after the file chat room badge value is reset (S670). In this instance, the file chat room badge value starts going up from zero and getting updated (S640). If there are no more new chat messages or log messages that are entered or created for a preset amount of time (S670), a final updated version of the file may be stored (S680). As the final updated version of the file is stored, previous versions of the file may be deleted. Deleting previous versions of the file may be done upon receiving a request signal for deletion from the user terminal 120 or according to the settings regarding deletion.

The disclosed technology may have the following effects. However, since it does not represent that a specific embodiment should include all the following effects or should include only the following effects, it should not be understood that the scope of the disclosed technology is limited thereby.

According to an exemplary embodiment of the present invention, there is provided a tool for communication about a task-related file between task members through a chat room associated with the file.

According to an exemplary embodiment of the present invention, there is provided a task processing technology associated with a chat room that can keep a record of modifications or changes to a particular file made by members, along with the file, through a chat room associated with the file.

Although preferred exemplary embodiments of the present invention have been described above, those skilled in the art will understand that the present invention may be variously modified and changed without departing from the spirit and scope of the present invention described in the following claims.

What is claimed is:

1. A file-related task management device comprising:
    a memory; and
    at least one processor electrically connected to the memory and configured to
        create a file chat room that is associated with a file in a folder shared by one or more folder sharers and is accessible through the file,
        receive, from a user terminal, a chat message related to the file between the one or more folder sharers,
        receive, from the user terminal of the one or more folder sharers, an update log including an update to the file made by the user terminal,
        create a log message including information about the update, based on the update log,
        initiate display of a message thread in the file chat room, the message thread including chat messages related to the file between the one or more folder sharers, and
        insert the log message in the message thread based on the log message being associated with the file related to chat messages displayed in the message thread,
    wherein the chat messages related to the file between the one or more folder sharers and the log message are displayed together in the message thread in an order the chat messages and the log message are created,
    wherein the log message is displayed together with the chat messages by inserting the log message between the chat messages in the order the chat messages and the log message are created, the chat message being different than the log message,
    wherein the at least one processor is further configured to open and use only a normal chat room that is related to a particular file and not display the log message, and when the particular file is modified or changed, the at least one processor switches the normal chat room to the file chat room, and
    wherein the log message cannot be displayed in the normal chat room and the file chat room is different than the normal chat room.

2. The file-related task management device of claim 1, wherein the at least one processor is further configured to create a chat file object that is opened through the file, rendered through the file chat room, and includes the message thread, and update the chat file object by continuously inserting new chat messages and log messages into the message thread.

3. The file-related task management device of claim 1, wherein the at least one processor stores a final version of the file which was updated most recently by the user terminal, and deletes previous versions of the file in order of oldest to most recent.

4. The file-related task management device of claim 1, wherein the at least one processor checks the user terminal's rights by using identification information of the user terminal, and receives the update log from the user terminal only when the user terminal is found to have the right to update the file.

5. The file-related task management device of claim 1, wherein the at least one processor checks the user terminal's rights by using identification information of the user terminal, and stores the update log only when the user terminal is found to have the right to update the file.

6. The file-related task management device of claim 1, wherein, if either a new chat message or a new log message or both are created, the at least one processor sends a notification message to the user terminal of the folder sharer who has the right to access the file.

7. The file-related task management device of claim 1, wherein the at least one processor creates a log message containing information about the folder sharer who updated the file and details of the update.

8. The file-related task management device of claim 1, wherein the at least one processor displays an updated portion of the file, along with the log message, in the file chat room.

9. The file-related task management device of claim 1, wherein the at least one processor provides an access path to a final version of the file, along with the log message, to the file chat room.

10. The file-related task management device of claim 1, wherein the at least one processor provides a file chat room badge for the file chat room, when providing the file chat room, and
    wherein the file chat room badge indicates a number of chat messages and a number of log messages that have not been read by the user terminal, among all the chat messages and the log messages.

11. The file-related task management device of claim 10, wherein the file chat room badge comprises a first badge and a second badge, and wherein the first badge indicates the number of chat messages that have not been read yet by the user terminal, and the second badge indicates the number of log messages that have not been read yet by the user terminal.

12. The file-related task management device of claim 1, wherein the update log is generated in association with the chat message, and
wherein the at least one processor is further configured to create information on the association between the log message and the chat message.

13. The file-related task management device of claim 12, wherein in a case the file is updated through the chat message, the log message contains identification information of the chat message and the chat message contains identification information of the log message.

14. The file-related task management device of claim 13, wherein the chat message and the log message associated with each other are continuously displayed together in the message thread.

15. A file-related task management method that is performed by a file-related task management device comprising a memory and a processor electrically connected to the memory, the method comprising:
creating a file chat room that is associated with a file in a folder shared by one or more folder sharers and is accessible through the file;
receiving, from a user terminal, a chat message related to the file between the one or more folder sharers;
receiving, from the user terminal of the one or more folder sharers, an update log including an update to the file made by the user terminal;
creating a log message including information about the update, based on the update log;
displaying a message thread in the file chat room, the message thread including chat messages related to the file between the one or more folder sharers;
inserting the log message in the message thread based on the log message being associated with the file related to chat messages displayed in the message thread,
wherein the chat messages related to the file between the one or more folder sharers and the log message are displayed together in the message thread in an order the chat messages and the log message are created, and
wherein the log message is displayed together with the chat messages by inserting the log message between the chat messages in the order the chat messages and the log message are created, the chat message being different than the log message;
opening and using only a normal chat room that is related to a particular file and not displaying the log message; and
switching, when the particular file is modified or changed, the normal chat room to the file chat room,
wherein the log message cannot be displayed in the normal chat room and the file chat room is different than the normal chat room.

16. A non-transitory computer-readable medium having embodied thereon a program, which when executed by a computer causes the computer to execute a method, the method comprising:
creating a file chat room that is associated with a file in a folder shared by one or more folder sharers and is accessible through the file;
receiving, from a user terminal, a chat message related to the file between the one or more folder sharers;
receiving, from the user terminal of the one or more folder sharers, an update log including an update to the file made by the user terminal;
creating a log message including information about the update, based on the update log;
displaying a message thread in the file chat room, the message thread including chat messages related to the file between the one or more folder sharers;
inserting the log message in the message thread based on the log message being associated with the file related to chat messages displayed in the message thread,
wherein the chat messages related to the file between the one or more folder sharers and the log message are displayed together in the message thread in an order the chat messages and the log message are created, and
wherein the log message is displayed together with the chat messages by inserting the log message between the chat messages in the order the chat messages and the log message are created, the chat message being different than the log message;
opening and using only a normal chat room that is related to a particular file and not displaying the log message; and
switching, when the particular file is modified or changed, the normal chat room to the file chat room,
wherein the log message cannot be displayed in the normal chat room and the file chat room is different than the normal chat room.

\* \* \* \* \*